United States Patent
Wu et al.

(10) Patent No.: US 7,358,791 B2
(45) Date of Patent: Apr. 15, 2008

(54) DISCHARGE PROTECTION CIRCUIT

(75) Inventors: Todd Wu, Taoyuan County (TW); Yueh-lung Huang, Taoyuan County (TW); Yi-chieh Cho, Taoyuan County (TW); Tung-hung Hsiao, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 533 days.

(21) Appl. No.: 10/859,212

(22) Filed: Jun. 3, 2004

(65) Prior Publication Data
US 2005/0146820 A1  Jul. 7, 2005

(30) Foreign Application Priority Data
Jan. 7, 2004  (TW) .............................. 93100377 A

(51) Int. Cl.
*H03K 17/56* (2006.01)
(52) U.S. Cl. ........................... 327/424; 327/494
(58) Field of Classification Search .................. 327/494
See application file for complete search history.

(56) References Cited

U.S. PATENT DOCUMENTS 4,626,980 A * 12/1986 McGuire ................. 363/56.05
4,717,841 A * 1/1988 Dumortier et al. .......... 327/461
2006/0170043 A1* 8/2006 Liu et al. ..................... 257/341

FOREIGN PATENT DOCUMENTS

JP          08-214524 A      8/1996
JP          2003-248904 A    9/2003

* cited by examiner

*Primary Examiner*—Ronald W. Leja
(74) *Attorney, Agent, or Firm*—Birch, Stewart, Kolasch & Birch, LLP

(57) ABSTRACT

A discharge protection circuit for discharging a full-bridge circuit in a brushless DC fan, wherein the brushless DC fan comprises a control circuit outputting at least one first control signal and at least one second control signal to the full-bridge circuit. The second control signal is a reverse signal of the first control signal; and the full-bridge circuit comprises a first impedance, a second impedance and a switch. The switch has a first terminal, a second terminal, and a third terminal that is grounded. The first terminal and the first impedance are in series connection for receiving the first control signal to control the status of the switch. The second terminal and the second impedance are in series connection and are connected to the input terminal of the second control signal of the full-bridge circuit, and the full-bridge circuit is discharged according to the status of the switch.

20 Claims, 6 Drawing Sheets

US 7,358,791 B2

DISCHARGE PROTECTION CIRCUIT

This Non-provisional application claims priority under 35 U.S.C. §119(a) on Patent Application No(s). 093100377 filed in Taiwan on Jan. 7, 2004, the entire contents of which are hereby incorporated by reference.

BACKGROUND OF THE INVENTION

1. Field of the Invention

This invention relates to a discharge protection circuit, and more particularly, to a discharge protection circuit for discharging a full-bridge circuit in a brushless DC fan.

2. Description of the Related Art

The structure of a conventional brushless DC fan as shown in FIG. 1 comprises a fan 10, a control circuit 11, a full-bridge circuit 12 and a discharge protection circuit 13. In the full-bridge circuit 12, a switch $L_1$ is in reverse state of a switch $L_3$, and a switch $L_2$ is in the reverse state of a switch $L_4$. Using the switches $L_1$ and $L_3$ as an example, if a node $A_1$ in the control circuit 11 outputs a high-level signal, a node $A_3$ in the control circuit 11 will output a low-level signal to set the switch $L_1$ in the full-bridge circuit 12 to ON, and the switch $L_3$ in the full-bridge 12 to OFF. On the other hand, if the node $A_1$ in the control circuit 11 outputs a low-level signal, the node $A_3$ in the control circuit 11 will output a high-level signal to set the switch $L_1$ in the full-bridge circuit 12 to OFF, and the switch $L_3$ to ON.

In order to prevent malfunction in switches $L_3$ and $L_4$ in the full-bridge circuit 12, any possible remaining current in the switches $L_3$, $L_4$ is grounded by the discharge protection circuit 13 when the switches are OFF. The conventional discharge protection circuit 13 shown in FIG. 2 comprises two switches $S_1$ and $S_2$, and three resistors $R_1$, $R_2$, and $R_3$. The course of operation is: when the node $A_1$ of the control circuit 11 outputs a low-level signal and the node $A_3$ outputs a high-level signal, the switch $S_1$ is ON, a power $V_{cc}$ is grounded, and the switch $S_2$ is OFF, thus the switch $L_3$ of the full-bridge circuit 12 operates normally. When the node $A_1$ of the control circuit 11 outputs a high-level signal and the node $A_3$ outputs a low-level signal, the switch $S_1$ is OFF, the power $V_{cc}$ sets the switch $S_2$ to ON, and thus the switch $L_3$ of the full-bridge 12 is grounded to discharge current to prevent any malfunction.

The foregoing discharge protection circuit uses relatively more electronic elements and the circuit structure is more complicated. Therefore, how to reduce the number of electronic elements used by a discharge protection circuit in order to simplify its design while maintaining the discharge protection function is the focus of the invention.

SUMMARY OF THE INVENTION

In view of the above-mentioned problems, an object of this invention is to provide a discharge protection circuit that uses less electronic elements; hence its design is simplified.

According to the design of the invention, a discharge protection circuit of this invention is used to discharge a full-bridge circuit in a brushless DC fan. The brushless DC fan comprises a control circuit outputting at least one first control signal and at least one second control signal to the full-bridge circuit. Furthermore, the first control signal is a reverse signal of the second control signal. The discharge protection circuit comprises a first impedance, a second impedance, and a switch. The switch comprises a first terminal, a second terminal, and a third terminal that is grounded. The first terminal and the first impedance are connected in series for receiving the first control signal to control the status of the switch. The second terminal and the second impedance are connected in series and connected to another input terminal of the control signal of the full-bridge circuit to make the full-bridge circuit grounded according to the status of switch. Note here, the control circuit can also control the switch status by outputting a switch signal, which is in the same phase as the first control signal.

According to the discharge protection circuit of this invention, it uses one switch and two impedances to achieve the object of discharge protection and thus effectively reduces the use of electronic elements, which also simplifies the circuit design.

BRIEF DESCRIPTION OF THE DIAGRAMS

DESCRIPTION OF THE PREFERRED EMBODIMENTS

The following section uses relevant diagrams to illustrate a preferred embodiment of a discharge protection circuit of this invention, where same element will be denoted using same symbol for the description.

Figure 1:
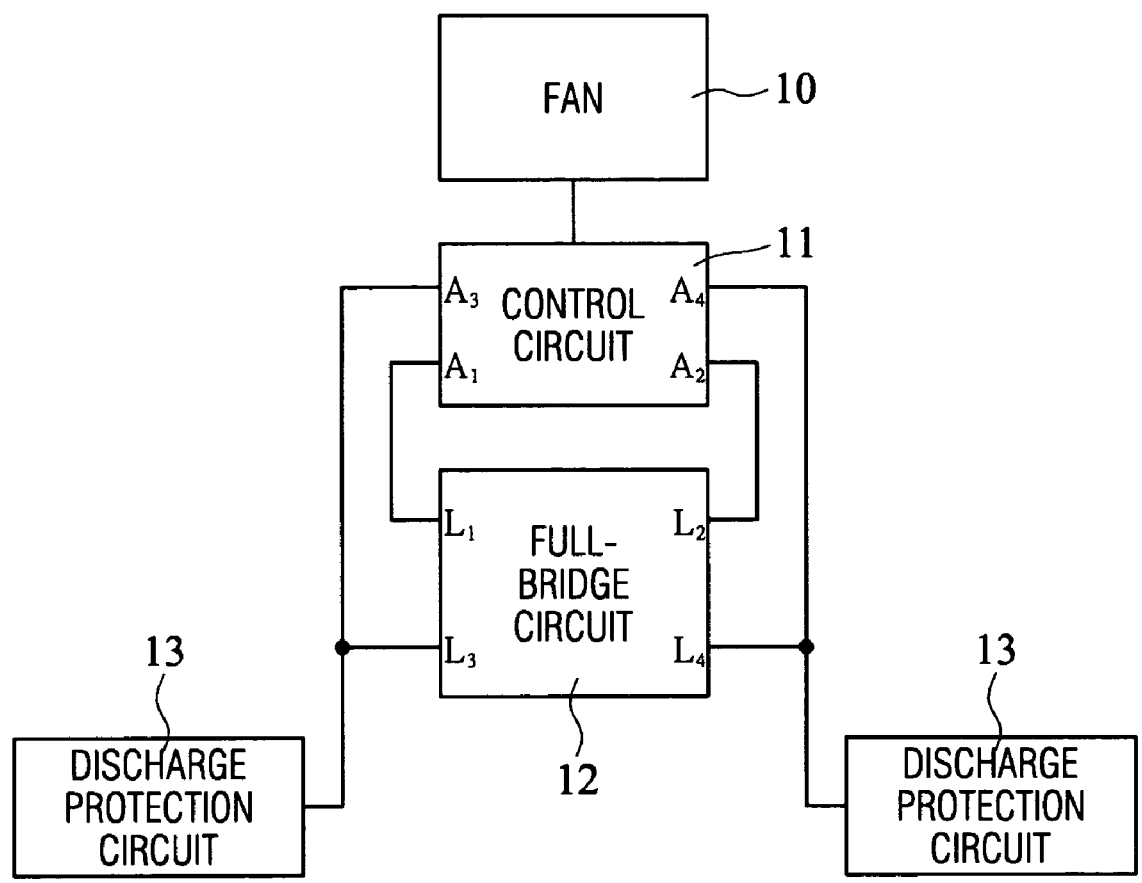
FIG. 1 is a block diagram illustrating the structure of a conventional brushless DC fan.
Figure 2:
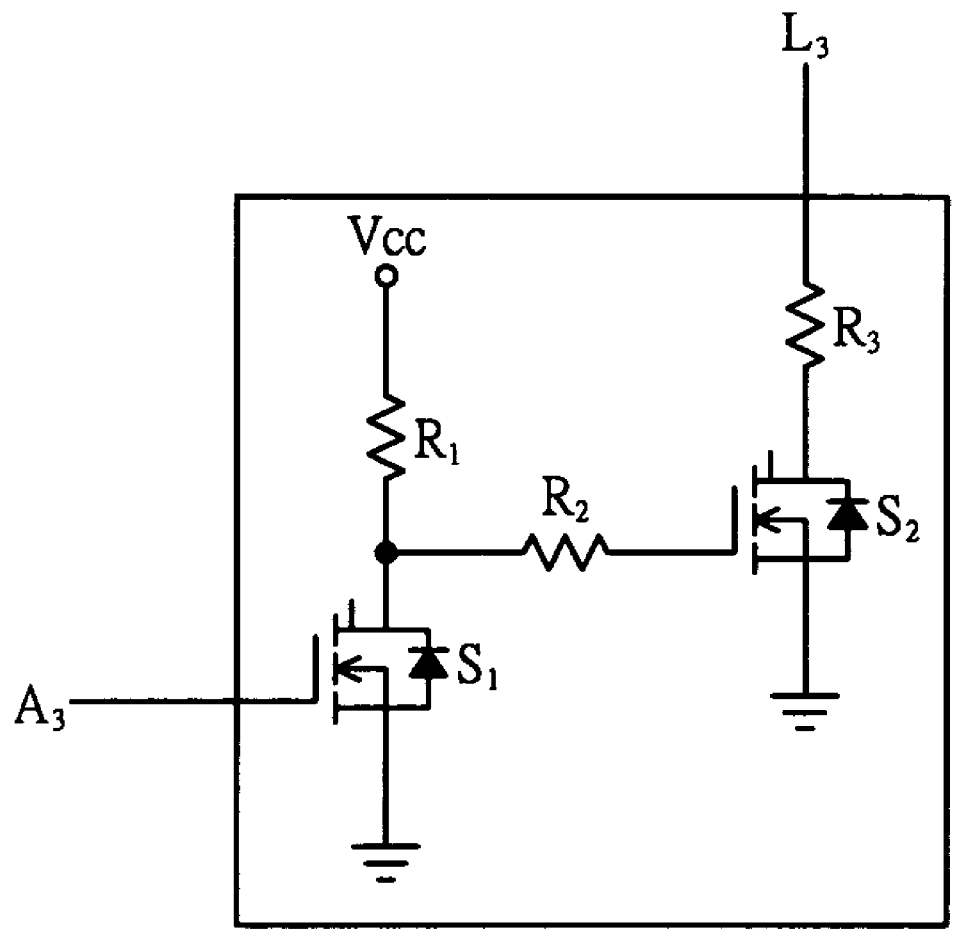
FIG. 2 is a circuit diagram of a conventional discharge protection circuit.
Figure 3:
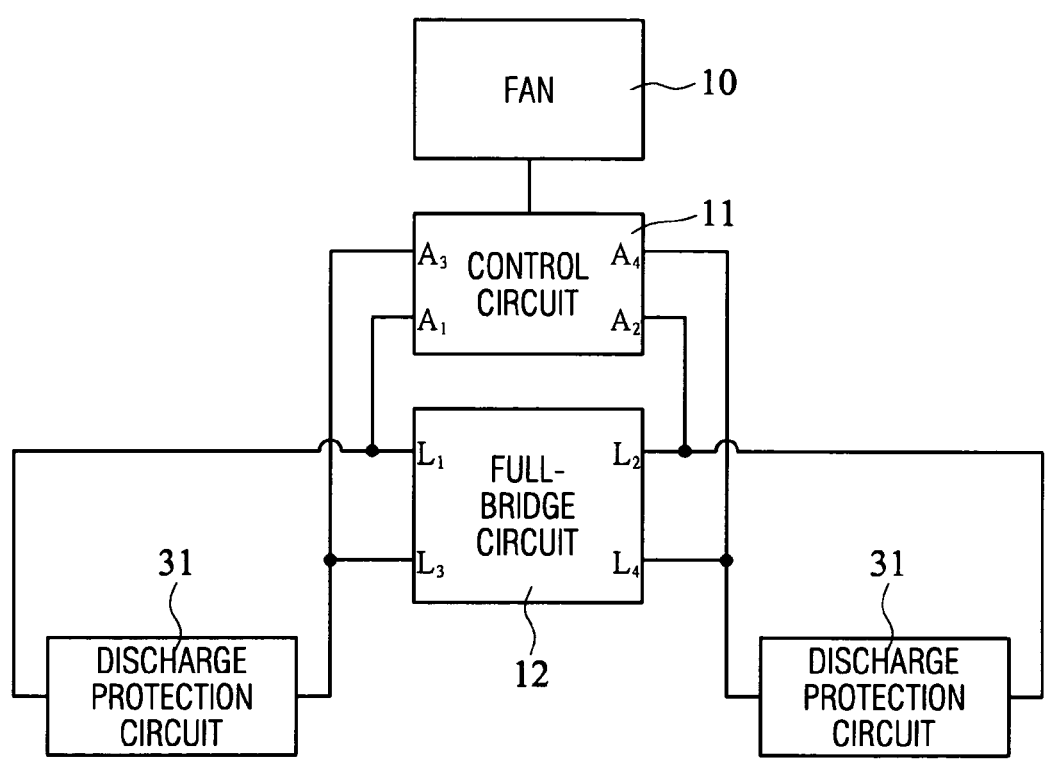
FIG. 3 is a block diagram illustrating the structure of a brushless DC fan in one preferred embodiment of the invention.

Referring to FIG. 3, a discharge protection circuit 31 of this invention is used to discharge a full-bridge circuit 12 in a brushless DC fan. The brushless DC fan further comprises a control circuit 11; the control circuit 11 and the full-bridge circuit 12 are the same as those conventional ones. That is, nodes $A_1$ and $A_3$ of the control circuit 11 output control signals that are reverse signals of one another, and nodes $A_2$ and $A_4$ output control signals that are reverse signals of one another, to the full-bridge circuit 12. For the ease of explanation, only the nodes $A_1$ and $A_3$ of the control circuit 11 are used in the following description. Meanwhile, the control signal outputting from the node $A_1$ will be referred to as a first control signal, and the control signal from the node $A_3$ will be referred to as a second control signal.

Figure 4A:
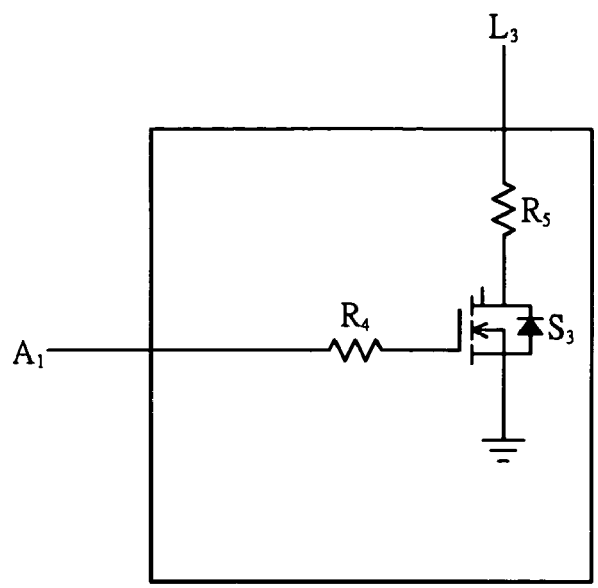
FIG. 4a is a circuit diagram of a discharge protection circuit in one preferred embodiment of the invention.
Figure 4B:
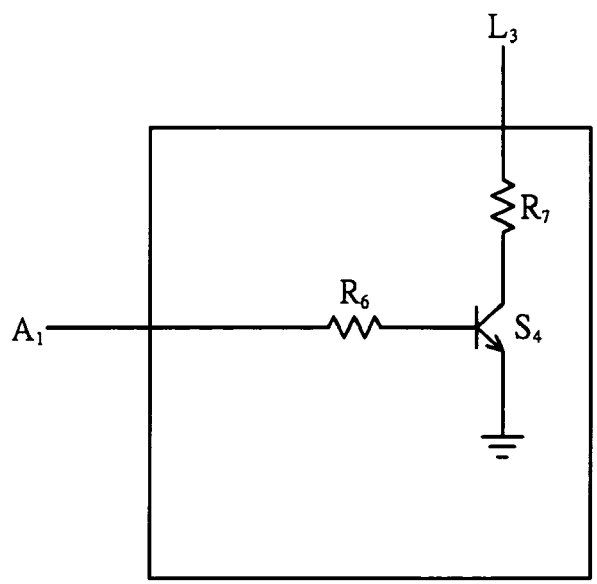
FIG. 4b is a circuit diagram of a discharge protection circuit in another preferred embodiment of the invention.

FIGS. 4a and 4b show circuit diagrams of a discharge protection circuit 31 of the invention comprising a first impedance, a second impedance, and a switch. As shown in FIG. 4a, a switch $S_3$ comprises a field effect transistor and a diode. The field effect transistor and the diode are in parallel connection, in which the drain of the field effect transistor is connected to the cathode of the diode, the source of the field effect transistor is connected to the anode of the diode, and the source of the field effect transistor is grounded. The first impedance is a resistor $R_4$, which is connected to the gate of the field effect transistor for receiving a first control signal outputting from the node $A_1$ of the control circuit 11. Therefore, the first control signal is used to control the status of the field effect transistor. The second impedance is a resistor $R_5$ with one end connected to the switch $L_3$ of the full-bridge circuit 12 and the other end connected to the drain of the field effect transistor. When the first control signal sets the switch $S_3$ ON, the switch $L_3$ in the full-bridge circuit 12 is grounded.

Referring to the circuit diagram shown in FIG. 4b, the differences between FIGS. 4a and 4b are that a bipolar transistor is used as a switch $S_4$, and the first and second impedances are replaced by resistors $R_6$ and $R_7$ respectively. The resistor $R_6$ is connected to the base of the bipolar transistor, and receives the first control signal for controlling the status of the bipolar transistor. One end of the resistor $R_7$ is connected to the switch $L_3$ of the full-bridge circuit 12, and the other end is connected to the collector of the bipolar transistor. When the first control signal sets the switch $S_4$ ON, the switch $L_3$ in the full-bridge circuit 12 is grounded through the emitter of the bipolar transistor.

Figure 5:
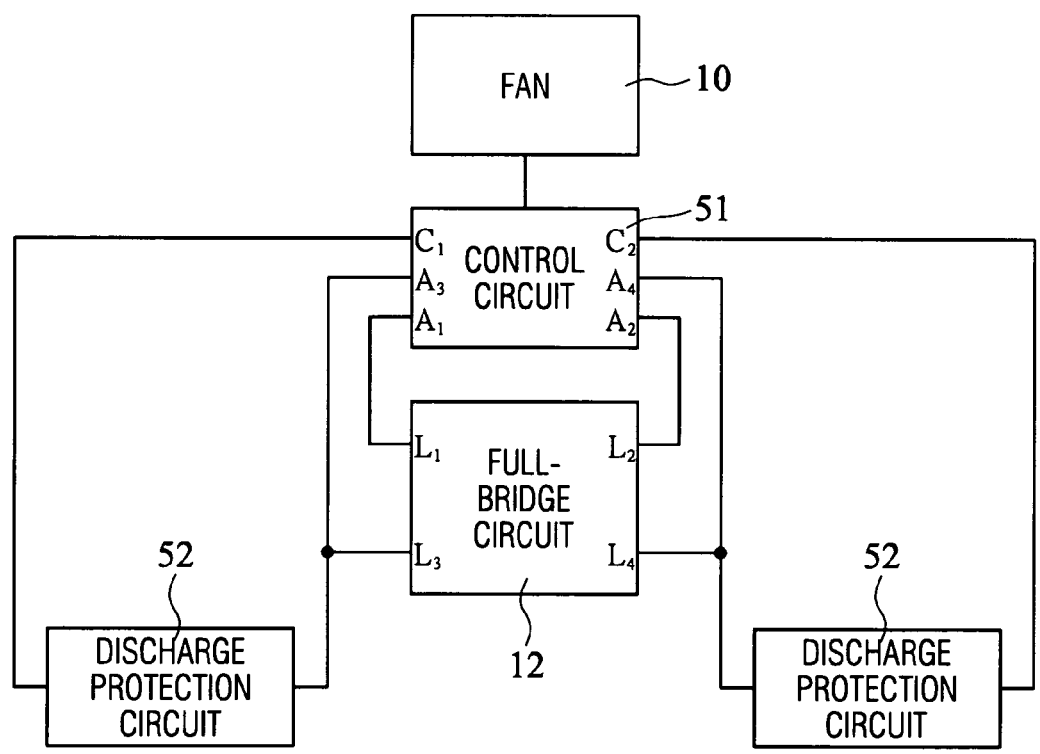
FIG. 5 is a block diagram illustrating the structure of a brushless DC fan in another preferred embodiment of the invention.
Figure 6:
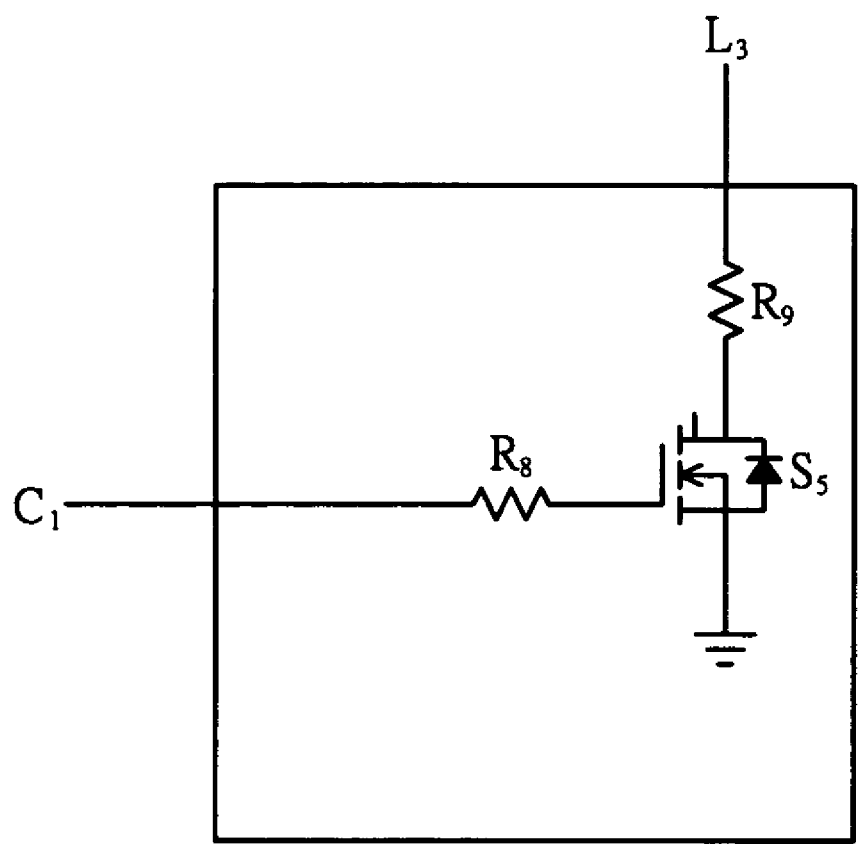
FIG. 6 is a circuit diagram of the discharge protection circuit in the other preferred embodiment of the invention.

FIG. 5 shows the structure of another brushless DC fan. The difference between FIG. 5 and FIG. 3 is that apart from outputting first control signals from nodes $A_1$ and $A_2$ and second control signals from nodes $A_3$ and $A_4$ to the full-bridge circuit 12, a control circuit 51 further outputs switch signals from nodes $C_1$ and $C_2$ to a discharge protection circuit 52. The first control signal and the second control signal are reverse signals of each other, and the switch signal and the first control signal are in the same phase. The circuit diagram of the discharge protection circuit 52 shown in FIG. 6 also comprises a first impedance, a second impedance and a switch; the connection method is the same as those shown in FIG. 4a and will not be described again here. The difference is that the status of the switch $S_5$ is controlled by the switch signal from node $C_1$, which is connected to the control circuit 51, not by the first control signal. The switch $S_5$ shown in FIG. 6 comprises a field effect transistor and a diode; however, one can replace the two with a bipolar transistor.

The following section briefly describes how the discharge protection circuit of this invention operates. Using FIG. 4a as an example, when the node $A_1$ of the control circuit 11 outputs a high-level control signal, the node $A_3$ will output a low-level control signal. At the same time, the switch $L_1$ of the full-bridge circuit 12 is ON, and the switch $L_3$ is OFF. To ensure the OFF state of switch $L_3$ of the full-bridge circuit 12, the high-level control signal from the node $A_1$ of the control circuit 11 sets the switch $S_3$ of the discharge protection circuit 31 to ON, which conducts the switch $L_3$ and the current flows to the ground for discharging. Likewise, when the node $A_1$ of the control circuit 11 outputs a low-level control signal, the node $A_3$ will output a high-level control signal. The low-level control signal from node $A_1$ of the control circuit 11 then sets the switch $S_3$ of the discharge protection circuit 31 to OFF. The switch $L_3$ of the full-bridge circuit 12 is ON, and the switch $L_1$ is OFF. The discharge protection circuit 52 shown in FIG. 6 also operates in a similar way. That is, when the node $A_3$ of the control circuit 51 outputs a low-level control signal, the node $A_1$ and the node $C_1$ outputs a high-level switch signal of the same phase to set switch $S_5$ ON in order to make the switch $L_3$ of the full-bridge circuit 12 grounded.

According to the discharge protection circuit of the invention, it requires only one switch and two impedances to achieve the object of discharge protection. Comparing with the conventional ones which use two switches and three impedances, the discharge protection circuit of this invention effectively reduces the number of electronic elements used, which simplifies the circuit design.

The above-mentioned is for exemplary, rather than limitation. Variations and modifications of the embodiments disclosed herein may be made by those skilled in the art based on the description set forth herein without departing from the scope and spirit of the invention. Therefore, any variations and modifications made without departing from the scope and spirit of the invention is included in the scope of the invention, which is defined by the following appended claims.

What is claimed is:

1. A discharge protection circuit for discharging a full-bridge circuit in a brushless DC fan, said brushless DC fan further comprising a control circuit for outputting at least one first control signal and at least one second control signal to said full-bridge circuit, said first control signal and said second control signal being reverse signals of each other, said discharge protection circuit comprising:
   a first impedance directly connected to the control circuit for receiving said first control signal;
   a second impedance connected to an input terminal of said full-bridge circuit for receiving the second control signal; and
   a switch having a first terminal and a second terminal;
   wherein said first terminal is connected to said first impedance for receiving said first control signal to control the status of said switch, said second terminal is connected to said second impedance for discharging said full-bridge circuit according to the status of said switch.

2. The discharge protection circuit of claim 1, wherein said switch further comprises a third terminal connected to ground.

3. The discharge protection circuit of claim 2, wherein said switch further comprises a field effect transistor, said first terminal is the gate of said field effect transistor, said second terminal is the drain of said field effect transistor, and said third terminal is the source of said field effect transistor.

4. The discharge protection circuit of claim 3, wherein said switch further comprises a diode having a cathode parallel connected with said second terminal, and an anode parallel connected with said third terminal.

5. The discharge protection circuit of claim 2, wherein said switch is a bipolar transistor, said first terminal is the base, said second terminal is the collector and said third terminal is the emitter, of said bipolar transistor.

6. The discharge protection circuit of claim 1, wherein said first impedance is a resistor and said second impedance is a resistor.

7. The discharge protection circuit of claim 1, wherein said discharge protection circuit includes a single switch.

8. A discharge protection circuit for discharging a full-bridge circuit in a brushless DC fan, said brushless DC fan further comprising a control circuit for outputting at least one first control signal and at least one second control signal to said full-bridge circuit, and outputting at least one switch signal to said discharge protection circuit, said first control signal and second control signal being reverse signals of each other, said switch signal being in the same phase as said first control signal, said discharge protection circuit comprising:
   a first impedance directly connected to the control circuit for receiving said switch signal;
   a second impedance connected to an input terminal of said full-bridge circuit for receiving the second control signal; and
   a switch having a first terminal and a second terminal;

wherein said first terminal is connected to said first impedance for receiving said switch signal to control the status of said switch, said second terminal is connected to said second impedance for discharging said full-bridge circuit according to the status of said switch.

9. The discharge protection circuit of claim 8, wherein said switch further comprises a third terminal connected to ground.

10. The discharge protection circuit of claim 9, wherein said switch further comprises a field effect transistor, said first terminal is the gate of said field effect transistor, said second terminal is the drain of said field effect transistor, and said third terminal is the source of said field effect transistor.

11. The discharge protection circuit of claim 10, wherein said switch further comprises a diode having a cathode parallel connected with said second terminal, and an anode parallel connected with said third terminal.

12. The discharge protection circuit of claim 9, wherein said switch is a bipolar transistor, said first terminal is the base, said second terminal is the collector, and said third terminal is the emitter, of said bipolar transistor.

13. The discharge protection circuit of claim 8, wherein said first impedance is a resistor.

14. The discharge protection of claim 8, wherein said second impedance is a resistor.

15. The discharge protection circuit of claim 9, wherein said discharge protection circuit includes a single switch.

16. A fan control device for controlling a fan, comprising:
a control circuit electrically connected to the fan;
a full-bridge circuit electrically connected to the control circuit; and
at least one discharge protection circuit having one terminal connected to the control circuit and the full-bridge circuit, and another terminal electrically connected to the full-bridge circuit and/or the control circuit wherein the at least one discharge protection circuit further comprises:
a first impedance directly connected to the control circuit for receiving a first control signal or a switch signal;
a second impedance connected to the full-bridge circuit for receiving a second control signal, the first control signal and the second control signal being reverse signals to each other; and
a switch having a first terminal and a second terminal;
wherein the first terminal is connected to the first impedance for receiving the first control signal or the switch signal to control the status of said switch, said second terminal is connected to said second impedance for discharging said full-bridge circuit according to the status of said switch.

17. The fan control device of claim 16, wherein said switch further comprises a field effect transistor, said first terminal is the gate of said field effect transistor, said second terminal is the drain of said field effect transistor, and said third terminal is the source of said field effect transistor.

18. The fan control device of claim 17, wherein said switch further comprises a diode having a cathode parallel connected with said second terminal, and an anode parallel connected with said third terminal.

19. The fan control device of claim 16, wherein said switch is a bipolar transistor, said first terminal is the base, said second terminal is the collector, and said third terminal is the emitter, of said bipolar transistor.

20. The fan control device of claim 16, wherein said first impedance is a resistor and said second impedance is a resistor.

* * * * *